US008029006B2

(12) United States Patent
Kalajyan

(10) Patent No.: US 8,029,006 B2
(45) Date of Patent: Oct. 4, 2011

(54) STACKABLE DOLLY

(75) Inventor: Artem Kalajyan, Industry, CA (US)

(73) Assignee: JPJ Investment Holding Co., Carson City, NV (US)

( * ) Notice: Subject to any disclaimer, the term of this patent is extended or adjusted under 35 U.S.C. 154(b) by 438 days.

(21) Appl. No.: 12/108,213

(22) Filed: Apr. 23, 2008

(65) Prior Publication Data

US 2009/0267313 A1 Oct. 29, 2009

(51) Int. Cl.
*B62B 3/16* (2006.01)

(52) U.S. Cl. .................. 280/33.998; 280/79.4; 280/651; 280/87.021

(58) Field of Classification Search ............. 280/33.998, 280/79.11, 79.4, 87.01, 87.021, 651
See application file for complete search history.

(56) References Cited

U.S. PATENT DOCUMENTS

| 5,445,396 | A | 8/1995 | Sebor | |
| 5,823,549 | A | 10/1998 | Morgan | |
| 6,257,152 | B1 * | 7/2001 | Liu | 108/53.3 |
| 6,729,631 | B2 * | 5/2004 | Trine et al. | 280/79.5 |
| 6,979,005 | B1 * | 12/2005 | McLerran | 280/33.998 |
| 7,118,115 | B2 * | 10/2006 | Abel | 280/43.13 |
| 2003/0205877 | A1 * | 11/2003 | Verna et al. | 280/79.11 |

FOREIGN PATENT DOCUMENTS

| GB | 727568 | 4/1955 |
| GB | 2229151 | 9/1990 |

* cited by examiner

*Primary Examiner* — J. Allen Shriver, II
*Assistant Examiner* — Erez Gurari
(74) *Attorney, Agent, or Firm* — Lackenbach Siegel, LLP; Myron Greenspan

(57) ABSTRACT

A stackable dolly includes a platform having upper and lower surfaces and a peripheral edge. A plurality of legs are generally coextensive with the platform and extend from the platform beyond the peripheral edge and extend radially outwardly from the platform beyond the platform periphery. Each leg includes an upper surface generally coextensive with the upper surface of the platform a lower surface serving as a mounting surface. The legs are equally angularly spaced from each other about the axis along the periphery of the platform. Casters are secured to each mounting surface of each leg. Engaging members are provided below the platform lower surface each engaging member being arranged approximate to the peripheral edge to abut against the peripheral edge of a cooperating dolly placed below the platform when the platform is supported on the cooperating dolly. The engaging members are restricting lateral movements of the engaged dollies relative to each other. In this manner, a plurality of dollies can be stacked one on top of the other while the engaging members maintain vertical stability of a stack of dollies by preventing adjacent dollies from shifting laterally from each other in relation to the axis.

20 Claims, 3 Drawing Sheets

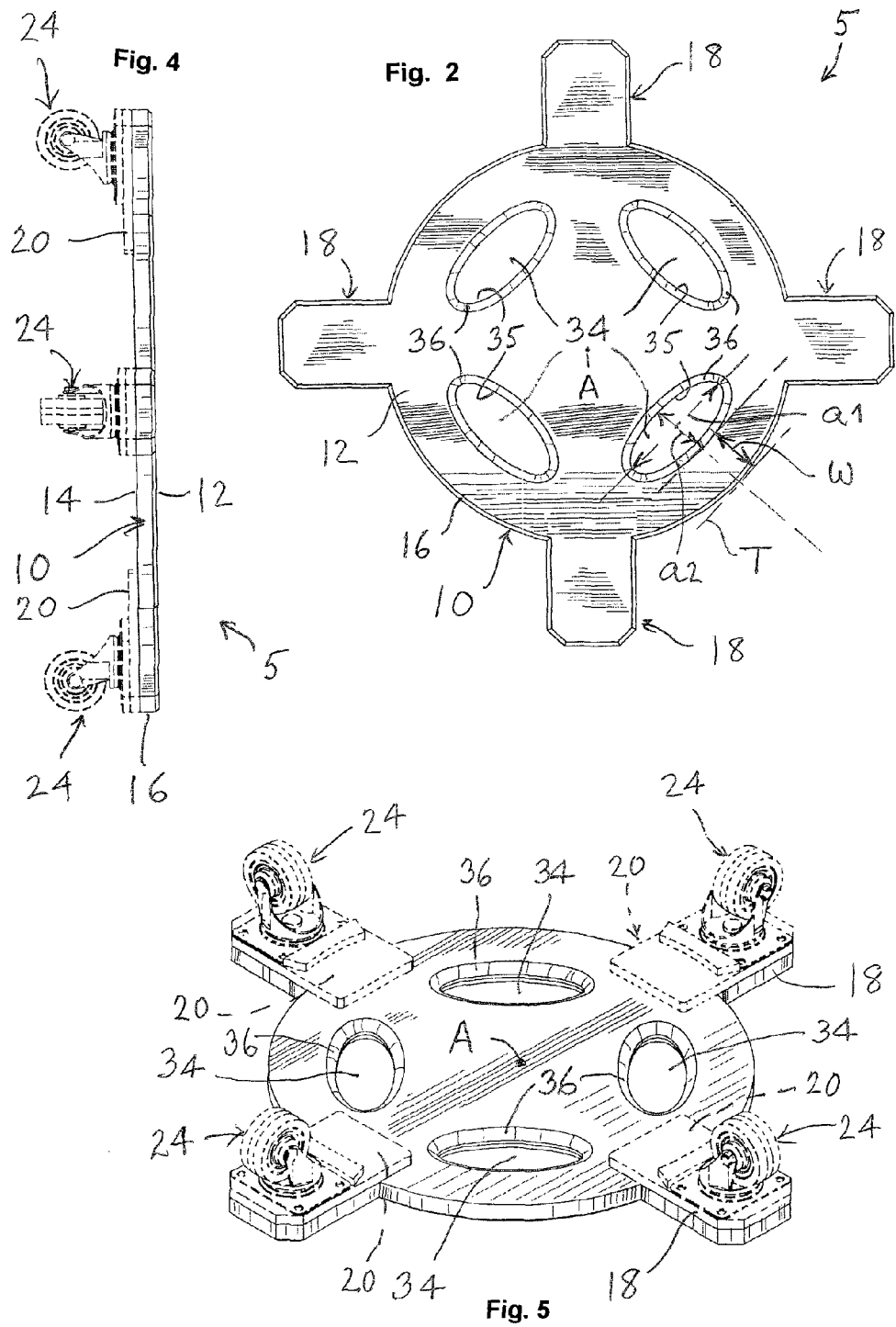

STACKABLE DOLLY

BACKGROUND OF THE INVENTION

1. Field of the Invention

This invention relates to general purpose dollies and, more specifically, to a dolly suitable for stacking a plurality of like dollies to minimize space requirements when the dollies are not in use.

2. Description of the Prior Art

Many dolly designs have been proposed for use in moving generally heavy objects. Many of the known dollies can be stacked. However, because they are not generally designed to optimize stacking, when many such dollies are stacked they do not generally stay aligned along a vertical direction but the column of dollies tends to incline or lean from the vertical and become unstable, possibly creating a dangerous condition since the stack may topple and cause injury. Examples of some prior art dollies are disclosed in the following patents:

U.K. Patent No. GB2229151;
U.K. Patent No. GB727568; and
U.S. Pat. No. 5,445,396.

In U.S. Pat. No. 5,823,549 a stacking dolly is disclosed that is specifically designed to render the dolly stackable while rendering a stack of such dollies stable even when a relatively large number of dollies stacked one on top of the other. However, the design disclosed in this patent relies on the use of depressions or apertures in the upper surfaces of the dollies and projections or protuberances projecting downwardly from the dollies intended to be received within the recesses or depressions of adjoining dollies on which they are supported. The problem with this design is that the projections or protuberances need to be precisely aligned with the recesses in a next lower dolly and proper stacking cannot take place unless the projections are received within the cooperating recesses or apertures. However, this may be somewhat inconvenient and time consuming and professionals, such as movers, may not have or wish to take the time out to carefully stack the dollies to make sure that they are properly aligned to optimize the design feature of the dolly.

SUMMARY OF THE INVENTION

Accordingly, in order to overcome the disadvantages inherent in the prior art dollies, it is an object of the present invention to provide a stackable dolly that does not have the disadvantages inherent in the prior art designs.

It is another object to provide a stackable dolly that is simple in construction and economical to manufacture.

It is still another object of the invention to provide a stacking dolly that can be easily and quickly stacked as well as removed from the stack.

It is yet another object of the invention to provide a stackable dolly of the type under discussion that can be arranged in stacks of at least approximately forty (40) dollies and remain stable during movement with no perceptible deviation or canting from the vertical direction.

It is a further object of the invention to provide a stackable dolly that is provided with reinforcing plates at each of the legs on which casters are mounted to enhance the load carrying ability of the dolly.

In order to achieve the above objects, as well as others which will become apparent hereinafter, a stackable dolly in accordance with the invention includes a platform having a predetermined thickness and defining opposing upper and lower surfaces and a peripheral edge generally uniformly spaced from a central axis normal to said platform. A plurality of legs are provided that are generally coextensive with said platform and extend from said platform beyond said platform periphery. Each leg defines an upper surface generally coextensive with said upper surface of said platform and a lower surface serving as a mounting surface. Said legs are generally equally spaced from each other about said axis along said periphery of said platform. A caster is secured to each mounting surface of each leg. Engaging members are provided below said platform's lower surface, each engaging member being arranged radially outwardly and proximate to said peripheral edge to abut against the peripheral edge of a cooperating dolly placed below said platform once the platform is supported on the cooperating dolly. Thus, a plurality of dollies can be stacked one on top of the other while said engaging members maintain vertical stability of a stack of dollies by reducing the extent to which adjacent dollies can shift laterally relative to each other and to said axis.

BRIEF DESCRIPTION OF THE DRAWINGS

The above and other objects, features and advantages of the present invention will be better understood from the following specification when read in conjunction with the accompanying drawings.

FIG. 2 is a top plan view of the dolly shown in FIG. 1;

FIG. 4 is a side elevational view of the dolly;

FIG. 5 is a bottom perspective view of the dolly;

DESCRIPTION OF THE PREFERRED EMBODIMENTS

Figure 3:
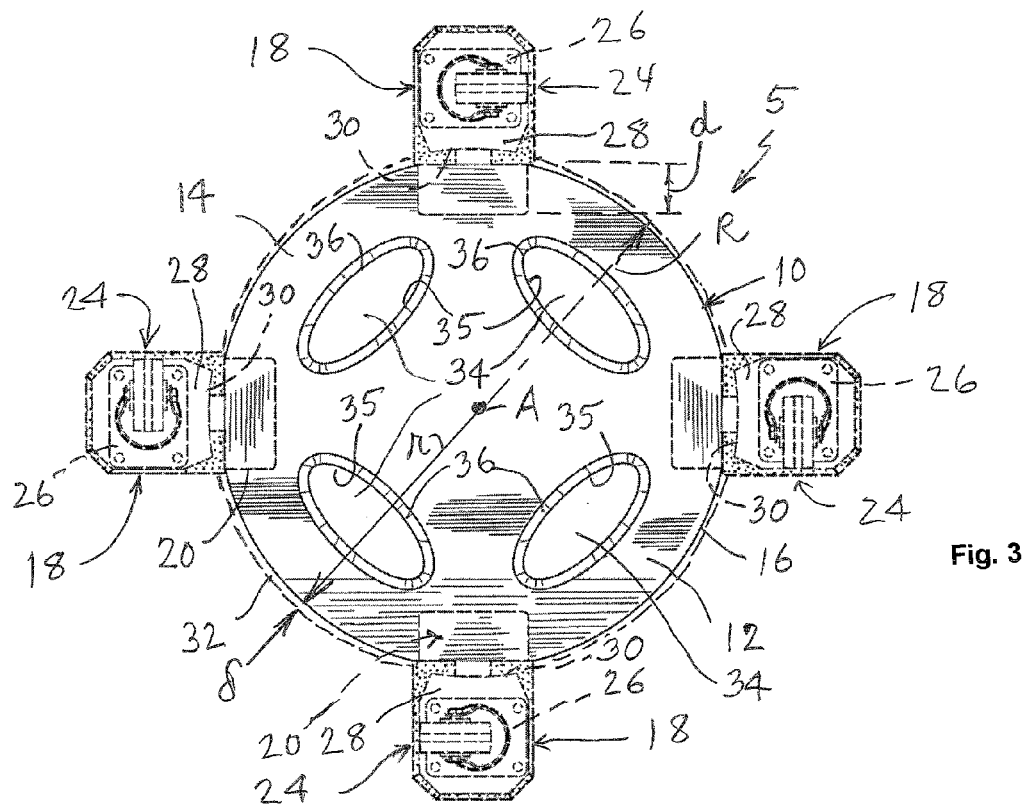
FIG. 3 is a bottom plan view of the dolly.
Figure 1:
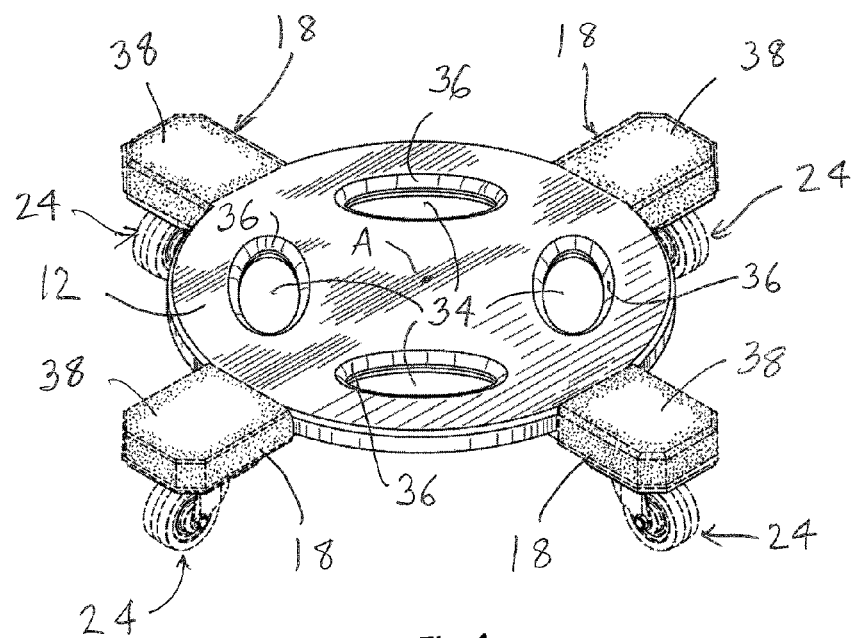
FIG. 1 is a perspective view of a stackable dolly in accordance with the present invention.

Referring now specifically to the figures, in which similar or identical parts are designated by the same reference numerals throughout, and first referring to FIG. 1, a stackable dolly in accordance with the present invention is generally designated by the reference numeral 5.

The stackable dolly 5 includes a platform 10 which is shown to be circular. However, it will be evident that this is not a critical feature of the invention and other platform configurations such as a square or hexagon, for example, can also be used. The platform 10 may be made of any suitable material typically used to make dollies. For example, the platform 10 may be made of wood or plastic. Any material that has sufficient strength and is relatively light in weight can be used. The platform has a thickness "t" selected to give the dolly sufficient strength and rigidity to support relatively heavy objects that are typically moved by such dollies. In the illustrated embodiment, the circular dolly has a radius "r", an upper surface 12 and a lower surface 14. The platform 10 has a periphery or peripheral edge 16 that forms, at any point along the periphery, a tangent direction "T" (FIG. 2).

Extending radially outwardly from the peripheral edge 16 are a plurality of legs 18. The legs 18 are substantially equally angularly spaced from each other about the axis "A". In the presently preferred embodiment, the legs 18 are integrally formed with the platform 10, although this is not critical and the legs can be securely attached to the platform at any known or conventional manner.

The legs, which are relatively narrow in width and yet must be capable of withstanding significant stresses may be reinforced. Thus, if weight "W" is placed on the dolly 5 each of the four legs 18 in the embodiment shown in FIGS. 1-5 must support ¼ of the total weight "W". When the dolly is to be used for transporting significantly heavy objects, there may be provided a support plate or brace 20 that is generally coextensive with the outline of the legs 18 and includes reinforcing portions 22 that extend inwardly beyond the periphery or peripheral edge 16. The support plates serve to distribute the stresses in the regions where the legs emanate from the platform as those regions experience the greatest stresses. The specific distance "d" (FIG. 2) that the reinforcing portion 22 extends beyond the peripheral edge 16 is not critical and may be selected to optimize the integrity of the dolly under varying anticipated loads.

Casters 24 are mounted on each of the legs as shown in a conventional manner. The specific nature of the casters is not critical and any casters suitable for this purpose may be used. Typically, such casters include a caster support plate 26 provided with holes suitable for use with fasteners, such as screws, to attach the casters to the under surface of a dolly.

An important feature of the present invention is the provision of alignment members 28 arranged, in the illustrated embodiment, between the caster plates 22 and the support plates 20. Each alignment member 28 includes, at its radially innermost end, an arcuate alignment edge 30. The arcuate edge 30 forms an arc of a circle having a radius "R". The circle defined by the arcuate edges 30 on each of the legs forms a circle that is slightly larger in radius than the radius "r" of the circle 32. Thus the circle defined by the alignment edges 30 has a radius "R" that is equal to the radius "r" of the platform plus a small increment δ, where δ is selected to provide a sufficient clearance to easily receive the peripheral edge of another dolly on which the dolly is supported between the alignment edges 30. The dimension δ should be selected to allow easy stacking of dollies while avoiding exclusively play to thereby maintain all of the dollies stacked one on top of the other so that the axes of the individual stacked dollies are substantially coincident or coextensive to each other along a vertical direction.

The platforms of each of the dollies is advantageously provided with a plurality of openings 34. The specific configuration of the openings 34 is not critical and any suitable shape can be used. The purpose of the openings 34 is to eliminate material within the body of the platform and, therefore, reduced the weight of the dolly. However, when properly configured and placed, the openings 34 can also be used for facilitating a user to grip the dolly and carry it, when not being used to transport an object. In the preferred embodiment, the openings 34 are shown as being oval shaped and having a major axis "a1" any minor axis "a2". The elliptical or oval or elliptical shaped openings are preferably arranged so that the major axes "a1" are generally parallel to a tangent "T" that intersects the direction of the minor axes "a2". In this way, the distance "w" (FIG. 2) between the peripheral edge 16 and the peripheral edge of the opening is selected to be sufficiently small so that a user can grasp the dolly along the peripheral edge 16 by inserting his or her fingers through the opening to facilitate grasping and carrying of the dolly.

The inner peripheries 35 of each of the openings 34 may be provided with bevels 36 to eliminate sharp edges and for making it more comfortable for a user to carry the dolly. The bevels also provide a more finished appearance for the product and enhances its appearance.

As is common with conventional dollies, carpeting or padded fabric 38 may be provided on the upper surfaces of each of the legs 18 to avoid scuffing or scratching furniture that is carried on the dollies.

Figure 6:
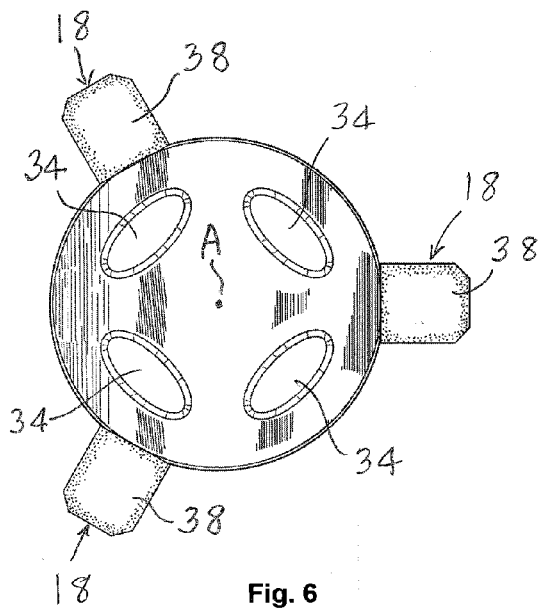
FIG. 6 is a top plan view of a modified embodiment of the stackable dolly.
Figure 7:
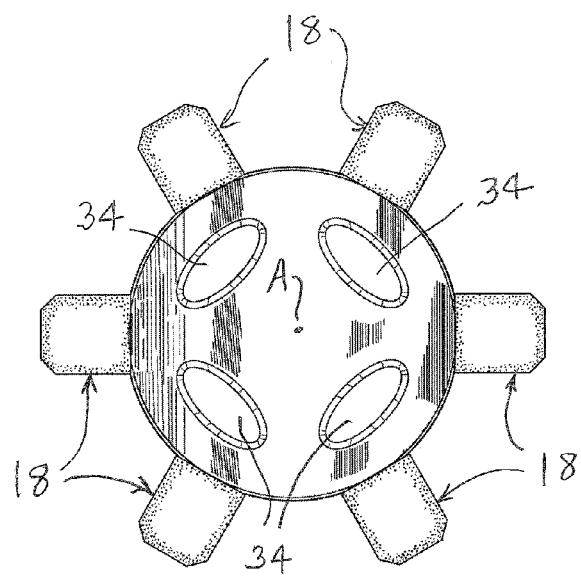
FIG. 7 is another modified embodiment of the stackable dolly.
Figure 8:
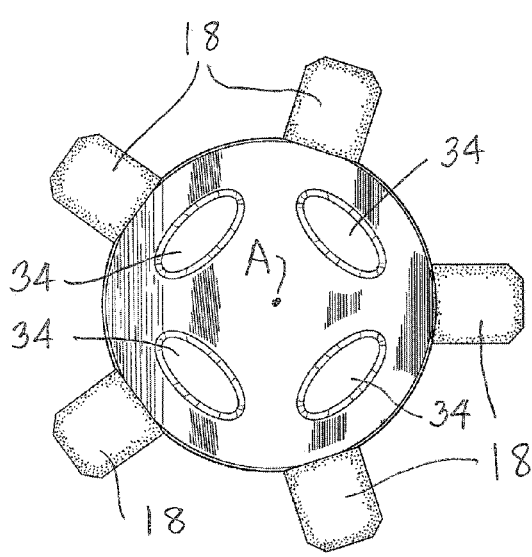
FIG. 8 is still another embodiment of the stackable dolly.

Referring to FIGS. 6-8, alternate embodiments of the dolly in accordance with the invention are shown. In FIG. 6 a dolly is provided with three legs equally distantly spaced from each other 120°. In FIG. 7, six legs are provided angularly spaced from each other 60°, while five legs are equally spaced from each other 72° on the dolly shown in FIG. 8.

Figure 9:
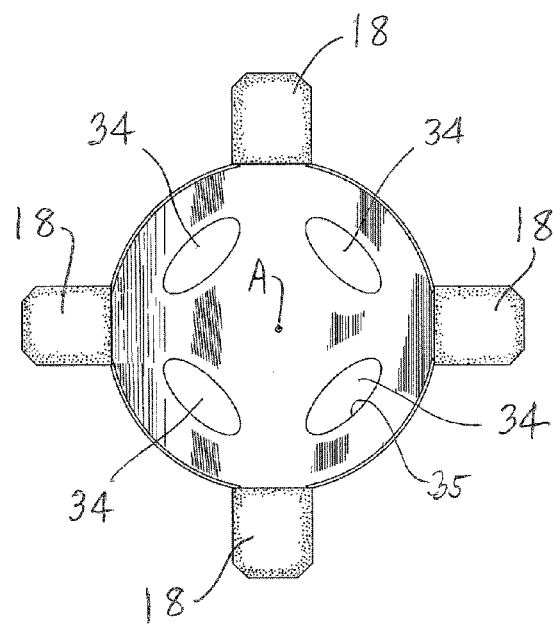
FIG. 9 is yet another embodiment of the stackable dolly.

In FIG. 9, a dolly similar to the one shown in FIGS. 1-5, shown in top plan view, wherein the inner peripheries 35 are simple cuts in the platform 10 and the inner peripheries are not provided with beveled surfaces as described in connection with the other embodiments.

It will be evident to those skilled in the art that the stackable dolly in accordance with the present invention provides a dolly configuration that is easy to stack and does not require precision alignment. The dolly is strong and can carry substantial weights, comparable to current or existing dollies, and is easy to carry as a result of the openings 34. It has been found that the dollies in accordance with the present invention can be stacked at least forty (40) high with no perceptible deviation or canting from the vertical direction and stable even when the stack is moved.

While the invention has been shown and described in connection with a preferred form of an embodiment it will be understood that modifications may be made without the departure from the scope or spirit of the invention.

The invention claimed is:

1. A stackable dolly comprising:
   a platform having a predetermined thickness and defining opposing generally flat upper and lower surfaces and a peripheral edge surface generally uniformly spaced from a central axis normal to said platform extending between said upper and lower surfaces and;
   a plurality of legs generally co-extensive with said platform and extending from said platform beyond said platform periphery, each leg defining an upper surface generally co-extensive with said upper surface of said platform and a lower surface serving as a mounting surface, said legs being substantially generally equally spaced from each other about said axis along said periphery of said platform;
   a plurality of alignment members each mounted on said mounting surface of an associated leg, each alignment member including an inwardly facing alignment edge being arranged radially outwardly and in opposition to said peripheral edge surface and substantially co-planar with a cooperating lower platform for abutting against a peripheral edge surface of the cooperating dolly placed below said platform when said platform of an upper dolly is supported on and shifted laterally in relation to a cooperating lower dolly; and
   a caster secured to each leg radially outwardly relative to an associated inwardly facing alignment edge,
   whereby a plurality of dollies can be stacked one on top of the other by contact of an upper dolly with a platform upper surface of a lower dolly while said alignment members maintain vertical stability of a stack of dollies by substantially preventing adjacent dollies from shifting laterally relative to each other in any lateral direction relative to said axis to effectively prevent any lateral movements of two associated dollies relative to each other.

2. A stackable dolly as claimed in claim 1, wherein four legs are provided with adjacent ones of said legs being angularly spaced from each other about said axis approximately 90°.

3. A stackable dolly comprising:
a platform having a predetermined thickness and defining opposing generally flat upper and lower surfaces and a peripheral edge surface extending between said upper and lower surfaces and generally uniformly spaced from a central axis normal to said platform;
a plurality of legs generally co-extensive with said platform and extending from said platform beyond said platform periphery, each leg defining an upper surface generally co-extensive with said upper surface of said platform and a lower surface serving as a mounting surface, said legs being substantially generally equally spaced from each other about said axis along said periphery of said platform;
means for providing engaging members, below said platform lower surface, each engaging member being arranged radially outwardly and proximate to said peripheral edge surface and substantially co-planar with a cooperating lower platform to abut against the peripheral edge of the cooperating dolly placed below said platform when said platform of an upper dolly is supported on a cooperating lower dolly,
a caster secured to each leg radially outwardly relative to an associated inwardly facing alignment edge,
whereby a plurality of dollies can be stacked one on top of the other by contact of an upper dolly with a platform upper surface of a lower dolly while said engaging members maintain vertical stability of a stack of dollies by substantially preventing adjacent dollies from shifting laterally relative to each other in any lateral direction relative to said axis to effectively prevent any lateral movements of two associated dollies relative to each other, and
wherein said platform is circular and each engaging member comprises a spacer between a caster and an associated leg and having an inwardly facing edge generally coextensive with a curve defining said peripheral edge surface of said platform.

4. A stackable dolly as claimed in claim 3, wherein said inwardly facing edge is arcuate and forms an arc of a circle having substantially the same radius as a radius of said platform.

5. A stackable dolly as claimed in claim 1, further comprising gripping means for gripping the dolly.

6. A stackable dolly as claimed in claim 5, wherein said gripping means comprises at least one opening or aperture within said platform through which fingers of a user may be extended and forming an edge along which the hand of a user can be gripped.

7. A stackable dolly as claimed in claim 6, wherein a plurality of openings or apertures are provided.

8. A stackable dolly as claimed in claim 7, wherein four apertures are provided generally proximate to and extending along said periphery.

9. A stackable dolly as claimed in claim 8, wherein said apertures are substantially equally spaced from each.

10. A stackable dolly as claimed in claim 9, wherein said apertures are equally displaced from each.

11. A stackable dolly as claimed in claim 7, wherein said apertures are generally elongated.

12. A stackable dolly as claimed in claim 7, wherein said apertures are generally elliptical.

13. A stackable dolly as claimed in claim 8, wherein the major axis of said apertures are generally parallel to tangents to said periphery.

14. A stackable dolly as claimed in claim 7, wherein said apertures define edges that are prepared to facilitate gripping and carrying.

15. A stackable dolly as claimed in claim 14, wherein said edges are beveled.

16. A stackable dolly as claimed in claim 14, wherein said apertures are generally oval.

17. A stackable dolly as claimed in claim 1, wherein said legs are integrally formed with said platform.

18. A stackable dolly as claimed in claim 1, further comprising strengthening means for strengthening said edges to sustain loads on said platform.

19. A stackable dolly as claimed in claim 18, wherein said strengthening means comprises a plate secured to said legs.

20. A stackable dolly as claimed in claim 19, wherein said plate are arranged between each leg and associated leg, and formed of a generally rigid material.

* * * * *